United States Patent
Venkataramanan et al.

(10) Patent No.: US 10,681,531 B2
(45) Date of Patent: Jun. 9, 2020

(54) SELECTION BETWEEN HOME AND VISITING NETWORKS

(71) Applicant: APPLE INC., Cupertino, CA (US)

(72) Inventors: Sriram Venkataramanan, San Jose, CA (US); Lakshmi N. Kavuri, Cupertino, CA (US); Vijay Venkataraman, San Jose, CA (US); Sai Kiran Gummuluri, San Jose, CA (US); Yifan Zhu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/001,393

(22) Filed: Jun. 6, 2018

(65) Prior Publication Data
US 2019/0132725 A1    May 2, 2019

Related U.S. Application Data

(60) Provisional application No. 62/579,981, filed on Nov. 1, 2017.

(51) Int. Cl.
*H04W 8/06* (2009.01)
*H04W 24/08* (2009.01)
(Continued)

(52) U.S. Cl.
CPC .............. *H04W 8/06* (2013.01); *H04W 24/08* (2013.01); *H04W 48/16* (2013.01); *H04W 84/042* (2013.01)

(58) Field of Classification Search
CPC ..... H04W 48/18; H04W 88/06; H04W 36/14; H04W 8/02; H04W 28/0268; H04W 36/22; H04W 76/15; H04W 76/10; H04W 8/04; H04W 8/06; H04W 36/0022; H04W 72/1242; H04W 84/042; H04W 36/26; H04W 48/20; H04W 4/50; H04W 76/00; H04W 76/50; H04W 8/08; H04W 36/18;
(Continued)

(56) References Cited

U.S. PATENT DOCUMENTS

| | | | | |
|---|---|---|---|---|
| 2004/0224684 A1* | 11/2004 | Dorsey | ................. | H04W 48/16 455/434 |
| 2008/0081616 A1* | 4/2008 | Zhao | ..................... | H04W 48/18 455/432.1 |
| 2012/0258710 A1* | 10/2012 | Swaminathan | ....... | H04W 48/16 455/433 |
| 2013/0109377 A1* | 5/2013 | Al-Khudairi | ......... | H04W 48/16 455/432.1 |
| 2014/0066055 A1* | 3/2014 | Balakrishnan | ........ | H04W 36/14 455/432.1 |

(Continued)

FOREIGN PATENT DOCUMENTS

WO    WO-2015180129 A1 * 12/2015   ........... H04B 1/3816

*Primary Examiner* — Daniel Lai
(74) *Attorney, Agent, or Firm* — Fay Kaplun & Marcin, LLP

(57) ABSTRACT

A method performed by a user equipment (UE) connected to a first home cell of a home public land mobile network (HPLMN). The method includes determining a type of the first home cell, when the type is a first type, determining a first quality of the connection to the first home cell, in response to the first quality not satisfying a first predetermined threshold or a determination that the type is a second type, disconnecting from the HPLMN, connecting to a first visited cell of a visited public land mobile network (VPLMN), determining a second quality of the connection to the first visited cell and when the second quality of the connection to the first visited cell is above a second predetermined threshold, performing a data exchange via the first visited cell.

19 Claims, 4 Drawing Sheets

(51) Int. Cl.
*H04W 48/16* (2009.01)
*H04W 84/04* (2009.01)

(58) Field of Classification Search
CPC ..... H04W 76/22; H04W 76/32; H04W 24/04; H04W 28/06; H04W 36/0083; H04W 36/00837; H04W 36/08; H04W 36/30; H04W 40/12; H04W 4/90; H04W 76/20; H04W 8/24; H04W 16/14; H04W 24/02; H04W 36/0016; H04W 36/16; H04W 4/30; H04W 92/02; H04W 48/16; H04W 24/08

See application file for complete search history.

(56) References Cited

U.S. PATENT DOCUMENTS

| | | | |
|---|---|---|---|
| 2014/0274035 A1* | 9/2014 | Unger | H04W 48/18 455/432.1 |
| 2015/0312831 A1* | 10/2015 | Sang | H04W 36/0083 370/236 |
| 2016/0095020 A1* | 3/2016 | Balakrishnan | H04W 36/0022 370/331 |
| 2016/0119858 A1* | 4/2016 | Liu | H04W 48/16 455/434 |
| 2016/0269890 A1* | 9/2016 | Chong | H04W 76/10 |
| 2016/0381547 A1* | 12/2016 | Jain | H04W 8/02 455/432.1 |
| 2018/0262960 A1* | 9/2018 | Bansal | H04W 36/08 |

\* cited by examiner

Network Arrangement
100

HPLMN
120

VPLMN
130

SELECTION BETWEEN HOME AND VISITING NETWORKS

PRIORITY/INCORPORATION BY REFERENCE

This application claims priority to U.S. Provisional Application 62/579,981 entitled "Selection Between Home and Visiting Networks," filed on Nov. 1, 2017, the entirety of which is incorporated herein by reference.

BACKGROUND INFORMATION

A user equipment (UE) may be configured to establish a connection to at least one of a plurality of different networks or types of networks to perform a variety of different functionalities via the connection. For example, the UE may connect to a first type of network (e.g., Long Term Evolution (LTE) network) to communicate with another UE through the network connection (e.g., a user of the UE may perform a voice call or transmit a text to another user of another UE). In another example, the UE may connect to a higher order radio access technology (RAT) (e.g., LTE, 5G, etc.) or a lower order RAT (e.g., 2G, 3G, etc.). In a further example, based on a location, settings on the UE (e.g., roaming), or service availability, the UE may connect to different public land mobile networks (PLMNs) such as a home PLMN (HPLMN) or a visited PLMN (VPLMN).

When the UE is capable of utilizing both the HPLMN or the VPLMN, the UE may prioritize the HPLMN over the VPLMN. However, there may be situations when the UE is at an edge of the coverage area of the HPLMN such that the connection has a relatively low throughput and takes a relatively long time to load data. In this situation, the UE may perform additional operations using additional power because of the weak connection to the HPLMN. Being at the edge of the coverage area of the HPLMN may place the UE in a coverage area of the VPLMN that may provide a relatively strong connection as compared to the weak connection with the HPLMN. Nevertheless, since the HPLMN is prioritized, the UE may remain using the HPLMN despite the better connection with the VPLMN being available.

Furthermore, the UE may be in a position (e.g., in a garage of a building) where service from the HPLMN or VPLMNs with a roaming agreement with the HPLMN (hereinafter "roaming VPLMN) may not be available. However, this service disruption may be only for a limited amount of time. When the UE moves to another position that is nearby (e.g., outside the garage), the service from the HPLMN or roaming VPLMN may become available. However, when the HPLMN or roaming VPLMN service is unavailable, the UE switches to a limited service scanning procedure that scans for available service. Of the cells that are found during the limited service scanning procedure, only VPLMN cells with no roaming agreement with the HPLMN (hereinafter "non-roaming VPLMN") are processed. That is, even if HPLMN cells or roaming VPLMN cells are found, the limited service scanning procedure ignores these results. Thus, after connecting to a non-roaming VPLMN cell, a subsequent procedure is used to scan for HPLMN or roaming VPLMN cells, results of which may coincide with the HPLMN or roaming VPLMN cell results from the limited service scanning procedure. Accordingly, the UE may utilize repetitive operations and additional power in establishing a connection to the HPLMN or the roaming VPLMN.

SUMMARY

In some exemplary embodiments, a method performed by a user equipment (UE) connected to a first home cell of a home public land mobile network (HPLMN) is described. The method includes determining a type of the first home cell, when the type is a first type, determining a first quality of the connection to the first home cell, in response to the first quality not satisfying a first predetermined threshold or a determination that the type is a second type, disconnecting from the HPLMN, connecting to a first visited cell of a visited public land mobile network (VPLMN), determining a second quality of the connection to the first visited cell and when the second quality of the connection to the first visited cell is above a second predetermined threshold, performing a data exchange via the first visited cell.

In other exemplary embodiments a user equipment (UE) having a transceiver configured to connect to a first home cell of a home public land mobile network (HPLMN) and a processor is described. The processor is configured to determine a type of the first home cell, when the type is a first type, determine a first quality of the connection to the first home cell, the processor, in response to the first quality not satisfying a first predetermined threshold or a determination that the type is a second type, instructs the transceiver to disconnect from the HPLMN and connect to a first visited cell of a visited public land mobile network (VPLMN), determine a second quality of the connection to the first visited cell and when the second quality of the connection to the first visited cell is above a second predetermined threshold, performing a data exchange via the first visited cell.

In still further exemplary embodiments, a user equipment (UE) having various circuitry is described. The circuitry includes circuitry configured to connect to a first home cell of a home public land mobile network (HPLMN), circuitry configured to determine a type of the first home cell, when the type is a first type, circuitry configured to determine a first quality of the connection to the first home cell, in response to the first quality not satisfying a first predetermined threshold or a determination that the type is a second type, circuitry configured to disconnect from the HPLMN, circuitry configured to connect to a first visited cell of a visited public land mobile network (VPLMN), circuitry configured to determine a second quality of the connection to the first visited cell and when the second quality of the connection to the first visited cell is above a second predetermined threshold, circuitry configured to perform a data exchange via the first visited cell.

In further exemplary embodiments a method is performed by a user equipment (UE) connected to a cell of a home public land mobile network (HPLMN). The method includes determining a service disruption in the HPLMN, wherein the service disruption indicates that no cells of the HPLMN are currently available for connection, issuing a scan request, wherein a scan request result includes cells of a non-roaming visited public land mobile network (VPLMN), the non-roaming VPLMN lacking a roaming agreement with the HPLMN and when the scan request result includes at least one cell of the HPLMN or a roaming VPLMN, the roaming VPLMN having the roaming agreement with the HPLMN, connecting to the HPLMN or the roaming VPLMN via the at least one cell, wherein a connection to the at least one cell of the HPLMN or the roaming VPLMN comprises a full service connection, wherein the connecting is in response to the scan request without a further scan request.

DETAILED DESCRIPTION

Figure 1:
FIG. 1 shows an example network arrangement according to various exemplary embodiments described herein.
Figure 1:
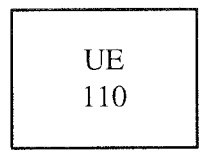
Figure 1:

The exemplary embodiments may be further understood with reference to the following description and the related appended drawings, wherein like elements are provided with the same reference numerals. The exemplary embodiments are related to a user equipment (UE) selecting a connection between different public land mobile networks (PLMNs). Specifically, the UE may select a home PLMN (HPLMN) or a visited PLMN (VPLMN) with which to establish the connection based on various mechanisms of the exemplary embodiments. Furthermore, the VPLMN may have a roaming agreement with the HPLMN (hereinafter "roaming VPLMN") or may not have a roaming agreement with the HPLMN (hereinafter "non-roaming VPLMN"). In a first mechanism, the exemplary embodiments are configured to utilize the PLMN that is determined to provide a minimum throughput based on current conditions before a fallback connection is selected. Specifically, the first mechanism may select between cells of the HPLMN or cells of roaming VPLMNs. In a second mechanism, the exemplary embodiments are configured to scan for PLMNs and establish a connection to a discovered PLMN with a corresponding setting. Specifically, the second mechanism may scan for cells of the HPLMN or roaming VPLMNs to provide full service or use a fallback connection to a cell of a non-roaming VPLMN to provide limited service.

Initially, it is noted that the exemplary embodiments are described with regard to the UE connecting to a cell of a HPLMN or a cell of a VPLMN. However, the cell and the HPLMN/VPLMN are only exemplary. The exemplary embodiments may be utilized with any first connection to a first network via a first network component of the first network and any second connection to a second network via a second network component of the second network. For example, the first and second networks may be within the HPLMN or the VPLMN. In another example, the first and second networks may be two types of networks (e.g., a wireless local area network (WLAN) and a cellular network) available to the UE. In a further example, the network component may be a base station, a router, a network management arrangement, a hub, an access point, etc.

It is also noted that the exemplary embodiments describe higher order radio access technologies (RATs) and lower order RATs within the HPLMN and the VPLMN. Specifically, a higher order RAT may be any network that provides a data exchange rate above a predetermined threshold (e.g., Long Term Evolution (LTE), 5G, 4G, etc.). A lower order RAT may be any network that provides a data exchange rate below the predetermined threshold (e.g., 3G, 2G, limited service, etc.). However, the designation of higher and lower order RATs is only exemplary and the exemplary embodiments may utilize any relative degree of higher and lower order RATs. For example, in subsequent adoptions of RATs, 4G and LTE may be grouped with the other noted lower order RATs while 5G remains a higher order RAT. It is also noted that in this description, a type of cell may refer to a cell of a specific type of network, e.g., a 3G cell, an LTE cell, a 5G cell, etc. or to a cell of networks of certain types, e.g., a cell of a higher order network or a cell of a lower order network.

With regard to the first mechanism in which a connection to a PLMN is selected based on throughput, there may arise scenarios when a UE is in a border roaming location. In the border roaming location, the UE may find the HPLMN and the connection may meet a minimum connection quality threshold (e.g., an S criteria). Accordingly, the UE will connect to the HPLMN. Through this connection, whenever data is attempted to be exchanged, the UE may transmit service requests to a serving cell in the HPLMN. However, in this border roaming scenario, the UE may not have a sufficiently high throughput rate and the data to be exchanged for the service request may require a significant amount of time and power to load the data. It is noted that the border roaming scenario is only exemplary and the first mechanism may be used at any time the HPLMN throughput rate is not sufficient. It is also noted that use of the first mechanism may occur when critical activities are not being performed. For example, in connected mode, when non-critical activities are ongoing, the first mechanism may be used to achieve a smooth user experience without any data stalls. In another example, in idle mode, the first mechanism may be selectively used to scan for further cells when a current cell does not provide sufficient throughput.

Alternatively, whether or not the UE is in the border roaming scenario, the UE may not find a higher order RAT in the HPLMN. Because the HPLMN is prioritized, the UE may get stuck on a lower order RAT (e.g., 2G coverage or 3G coverage) in the HPLMN. Thus, for data exchanges, the UE may transmit service requests in a serving cell of the lower order RAT in the HPLMN. However, in a substantially similar manner as a low throughput in the HPLMN border roaming scenario, the lower order RAT may not have a sufficiently high throughput rate and the data to be exchanged for the service request may require a significant amount of time and power to load the data.

In either of these scenarios in which a connection to the HPLMN has a low throughput rate, there may be instances when a higher order RAT in a VPLMN may be available. In such a scenario, the VPLMN may provide a higher throughput connection than any connection in the HPLMN, specifically via roaming VPLMN cells. Assuming the VPLMN is a roaming partner for the UE (e.g., based on capabilities of the UE, based on an arrangement with a HPLMN cellular service provider of the UE, etc.), relatively good coverage may be available to the UE via the VPLMN. In fact, the UE may have already been using the higher order RAT in the VPLMN for data exchanges (e.g., in the border roaming scenario), but because the HPLMN may be prioritized over the VPLMN, the UE may have connected to the HPLMN. Thus, the UE may have benefited from the throughput rate of the VPLMN but terminated this connection after the HPLMN is discovered via a scan. With the prioritization in place, the UE may have re-selected back to the HPLMN and the poor (or lower) throughput rate despite the better (or higher) throughput rate of the VPLMN being available.

The above prioritization and automatic selection protocol in which the HPLMN is always prioritized over the VPLMN may be a default setting of the UE or of the service provider of the UE. However, there may be users who accept any consequences (e.g., financial) and may benefit or prefer use of roaming when a higher throughput rate option is available in the VPLMN over the HPLMN. For example, the user may have manually entered a setting to enable data roaming (e.g., data roaming switch ON) or entered preference settings indicating the use of data roaming when available. For such users, an improved data experience through a higher throughput rate using the VPLMN may be provided instead of latching onto a lower throughput rate cell using the HPLMN simply because of a priority order.

Therefore, according to a first mechanism, the exemplary embodiments provide a re-selection to the VPLMN. Specifically, contrary to a priority order in which use of the HPLMN is prioritized over the VPLMN, the exemplary embodiments allow for a higher order RAT to be selected on the VPLMN (e.g., a LTE cell) in low throughput rate scenarios even when HPLMN cells are available. As will be described in further detail below, the UE may operate in a manner where network selections are performed automatically. With the first mechanism, when the UE is on a lower order RAT in the HPLMN or in cases of poor data performance/throughput on a higher order RAT in the HPLMN, the UE may utilize a re-selection to a higher order RAT in the VPLMN when available. Accordingly, the exemplary embodiments utilize an approach to place the UE in the VPLMN whenever HPLMN data performance is relatively poor on higher order RATS or camped on lower order RATs to provide an improved data exchange experience to the user of the UE. It is again noted that the higher order RAT on the VPLMN may relate to roaming VPLMN cells as, typically, non-roaming VPLMN cells may not provide a higher order RAT (e.g., only provided limited service). However, in instances where the non-roaming VPLMN cells allow for the UE to connect to higher order RATs, the first mechanism may also be used in connection with the non-roaming RATs if allowed by the user of the UE and/or the network provider.

With regard to the second mechanism in which the UE scans for cells in selected PLMNs, the UE may be located in a position in which HPLMN or roaming VPLMN service may be unavailable. This HPLMN service disruption may only be temporary. For example, the UE may have established a connection to the HPLMN, but at a later time, the UE may have moved inside a building, in a garage, in a tunnel, etc., resulting in the HPLMN service disruption. After a relatively short period of time, the UE may have moved out of the location where the HPLMN or roaming VPLMN service was unavailable such that the HPLMN or roaming VPLMN service may again be found to re-establish a connection to the HPLMN or the roaming VPLMN.

The scanning procedure may entail that the UE scans for cells of non-roaming VPLMNs when the UE has not found any cells of the HPLMN or the roaming VPLMN or no service is available on the HPLMN or the roaming VPLMN. When the HPLMN or roaming VPLMN service is unavailable and a cell of the non-roaming VPLMN is found, the UE may connect to the non-roaming VPLMN (e.g., with limited service such as emergency mode only).

The scanning procedure used when the HPLMN or roaming VPLMN service is unavailable only considers cells of the non-roaming VPLMN within the results of all cells that are discovered (including cells of the HPLMN and the roaming VPLMN). As noted above, since the HPLMN or roaming VPLMN service disruption may only be temporary, when scanning for cells of the non-roaming VPLMN, the UE may detect HPLMN or roaming VPLMN cells having relatively good energy that are suitable for acquisition. However, as described above, even if these cells of the HPLMN or roaming VPLMN are found, the UE (e.g., the access stratum (AS)) may ignore the cells of the HPLMN and the roaming VPLMN and proceed to connect to a cell of the non-roaming VPLMN instead since the scan request is specifically targeted for cells of the non-roaming VPLMN.

The time required to discover and re-connect to a cell of the HPLMN or the roaming VPLMN may therefore be increased using the conventional approach in which the scanning procedure only considers discovered cells of the non-roaming VPLMN. Specifically, at a later time, the UE would be required to use another scanning request for cells of the HPLMN or the roaming VPLMN. For example, when camped on the non-roaming VPLMN with limited service, the UE may start a timer and after the timer has expired (e.g., 6 minutes), the UE may initiate the HPLMN or the roaming VPLMN scanning request and search for cells of the HPLMN or the roaming VPLMN. Even if the timer were to be reduced, the same set of operations and time associated with these operations are included in the procedure to re-connect to the HPLMN or the roaming VPLMN. In another example, a substantially similar procedure may be used when cells of the non-roaming VPLMN are not found. Specifically, the UE may proceed with using the HPLMN or roaming VPLMN scanning request. The UE may repeat cycling between the HPLMN/roaming VPLMN scanning request and the non-roaming VPLMN scanning request until a cell of the corresponding PLMN is found. Thus, it is clear that the above scanning procedure causes additional signaling and potential power drain due to signaling and additional scans for cells in the HPLMN Therefore, according to the second mechanism, the exemplary embodiments provide a faster cell selection operation. Specifically, the cell selection may more efficiently enable connecting to the HPLMN with full service capability. By modifying the manner in which scans are performed, the UE may identify when cells of the HPLMN or the roaming VPLMN are discovered with any scan opportunity (e.g., including when a scan request is issued for cells of the non-roaming VPLMN). Therefore, the UE may decrease the amount of time to establish the connection to the HPLMN or the roaming VPLMN when a prior attempt results in the HPLMN or the roaming VPLMN being unavailable. The decrease in time may correspond to a decrease in operations in establishing the connection, which also increases power conservation.

FIG. 1 shows a network arrangement 100 according to the exemplary embodiments. The network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, etc. It should also be understood that an actual network arrangement may include any number of UEs being used by any number of users and being associated with any number of these users where the user may be associated with one or more of the UEs.

The UE 110 may be configured to communicate with one or more networks. With regard to the exemplary embodiments, the networks with which the UE 110 may wirelessly communicate include a HPLMN 120 and a VPLMN 130. However, it should be understood that the UE 110 may also communicate with other types of networks and/or other networks of the same type. The UE 110 may be configured to establish a connection with both the HPLMN 120 and the VPLMN 130. For example, the UE 110 may have the proper chipset that is used to communicate with the corresponding one of the HPLMN 120 and the VPLMN 130. The use of the two networks 120, 130 is only exemplary and there may be any other number of networks with which the UE 110 may communicate. For example, the network arrangement 100 may also include a WLAN.

Initially, a PLMN may be any network operated by an entity to provide mobile communications services to users. Although also configured to be used as a stand-alone system, the PLMN may operate with other systems such as a public switched telephone network (PSTN). The HPLMN 120 may be the PLMN with which the user has a subscriber profile. For example, the HPLMN 120 may be a specific vendor who provides cellular service to the UE 110 (e.g., Verizon, AT&T, Sprint, T-Mobile, etc.). Accordingly, the user of the UE 110 may have a subscription or agreement to receive the services on the HPLMN 120. The HPLMN 120 may include different types of deployed RATs such as legacy radio access networks (RANs), an LTE RAN, a 4G network, a 5G network, etc. Accordingly, the HPLMN 120 may include corresponding network components for the UE 110 to establish a connection. For example, the HPLMN 120 may include base client stations (e.g., Node Bs, eNodeBs, HeNBs, gNBs, etc.) that are configured to send and receive traffic from UEs that are equipped with the appropriate chip set. In this manner, the HPLMN 120 may comprise at least one HPLMN cell to which the UE 110 may establish a connection. The VPLMN 130 may be substantially similar to the HPLMN 120 with regard to operations, providing service, and including at least one VPLMN cell to which the UE 110 may establish a connection. However, the difference between the HPLMN 120 and the VPLMN 130 arises from the perspective of the user of the UE 110. Specifically, the user may only have a subscriber profile for the UE 110 on the HPLMN 120. Thus, any use of the VPLMN 130 by the UE 110 may utilize roaming services. Furthermore, the VPLMN 130 may include roaming VPLMNs and/or non-roaming VPLMNs. As noted above, the roaming VPLMN may be a VPLMN that has a roaming agreement with the HPLMN 120 while the non-roaming VPLMN may be a VPLMN which does not have a roaming agreement with the HPLMN 120. Thus, while the VPLMN 130 is shown as a single network, it should be understood that the VPLMN 130 may represent any number of networks.

Those skilled in the art will understand that the network arrangement 100 may include a variety of other components. For example, the network arrangement 100 may also include a cellular core network, the Internet, an IP Multimedia Subsystem (IMS), a network services backbone, etc. These further components may provide their respective functionalities as those skilled in the art will understand. The network arrangement 100 may also include sources of data for the UE 110. For example, the UE 110 may request a data exchange with a website server, an email host server, a streaming server, etc.

Figure 2:
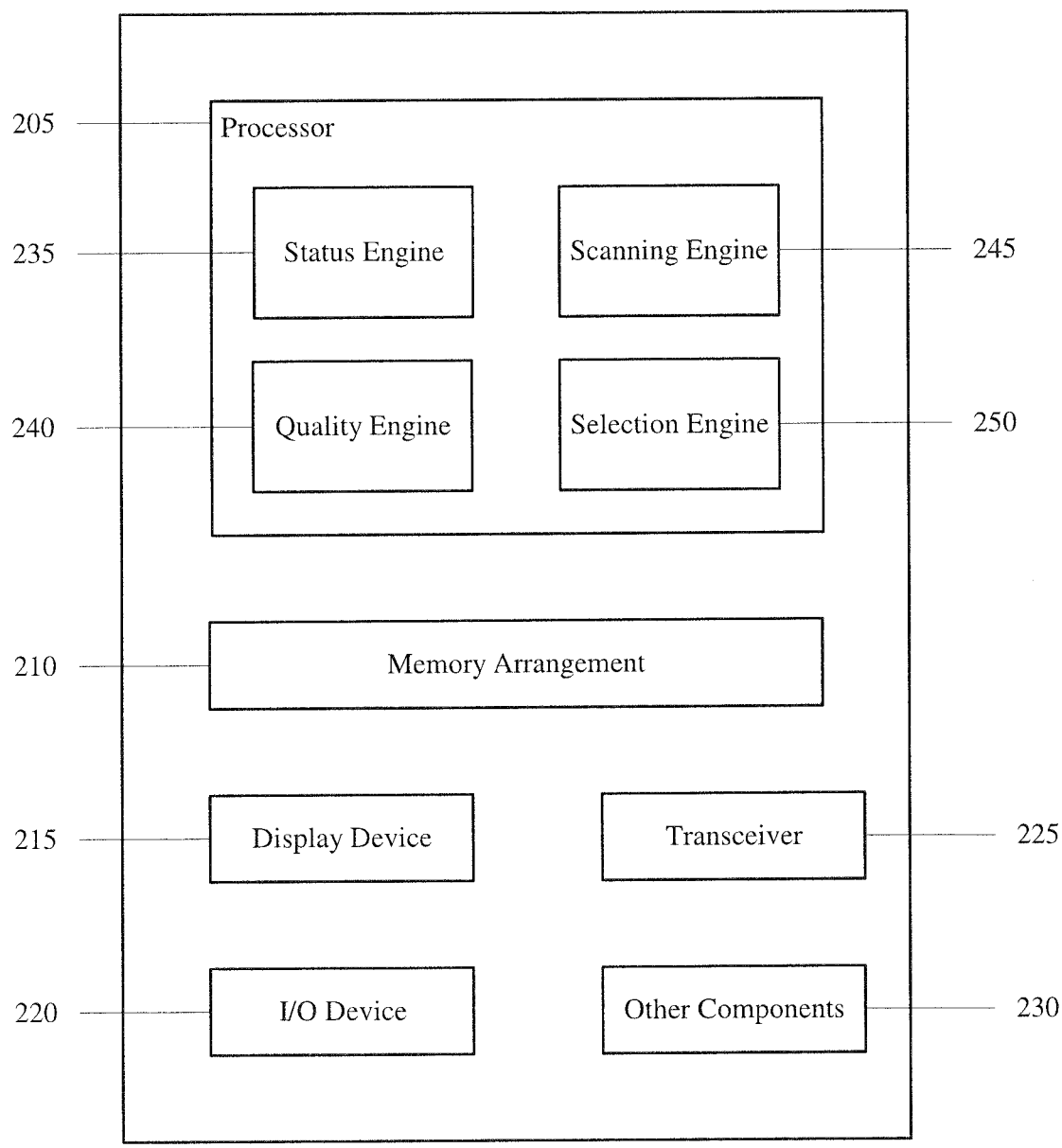
FIG. 2 shows an example user equipment according to various exemplary embodiments described herein.

The exemplary embodiments relate to the UE 110 selecting between the HPLMN 120 and the VPLMN 130. Using the first mechanism according to the exemplary embodiments, the UE 110 may utilize the PLMN that provides a sufficient throughput rate. Using the second mechanism according to the exemplary embodiments, the UE 110 may scan for the PLMNs to establish a connection to the HPLMN whenever available. FIG. 2 shows the UE 110 of the network arrangement 100 of FIG. 1 according to the exemplary embodiments. Specifically, the UE 110 is configured to execute a plurality of engines that perform functionalities to select between the HPLMN 120 and the VPLMN 130.

The UE 110 may represent any electronic device that is configured to wirelessly exchange data with the HPLMN 120 and/or the VPLMN 130. The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include a status engine 235, a quality engine 240, a scanning engine 245, and a selection engine 250. As will be described in further detail below, the status engine 235 may be configured to identify the current connection or lack of connection to a PLMN. The quality engine 240 may be configured to determine a quality of a current connection. The quality engine 240 may determine a throughput rate provided by the current connection. The scanning engine 245 may be configured to discover cells of the HPLMN 120 and/or the VPLMN 130. The selection engine 250 may be configured to select between the HPLMN 120 and the VPLMN 130 based on the outputs of the engines 235-245. In a first aspect under the first mechanism according to the exemplary embodiments, the selection engine 250 may select between the HPLMN 120 and roaming VPLMNS of the VPLMN 130 through analysis of throughput rates of HPLMN and VPLMN cells. In a second aspect under the second mechanism according to the exemplary embodiments, the selection engine 250 may select between the HPLMN 120 as well as roaming VPLMNs of the VPLMN 130 and non-roaming VPLMNs of the VPLMN 130 based on discovery of cells as results from scans.

In some exemplary implementations, the engines 235-250 alternatively may also be represented as components of one or more multifunctional programs, a separate incorporated component of the UE 110 or may be a modular component coupled to the UE 110, e.g., an integrated circuit with or without firmware. That is, the engines may be implemented in a variety of manners in hardware, software, firmware, or a combination thereof. For example, the integrated circuit may include input circuitry to receive signals and processing circuitry to process the signals and other information. In addition, in some UEs, the functionality described for the processor 205 is split among two or more processors, a baseband processor and an applications processor. The exemplary embodiments may be implemented in any of these or other configurations of a UE.

The memory 210 may be a hardware component configured to store data related to operations performed by the UE 110. For example, previous connections and details of these previous connections (e.g., a cell of a HPLMN or VPLMN) may be stored in a historical connection repository (not shown). The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to exchange data with the HPLMN 120 and the VPLMN 130.

With regard to the first mechanism according to the exemplary embodiments, the status engine 235, the quality engine 240, the scanning engine 245, and the selection engine 250 may perform corresponding operations in determining a selection between the HPLMN 120 and the VPLMN 130 for use in a data exchange. For illustrative purposes, any reference to the VPLMN 130 with the first mechanism may refer to roaming VPLMNs. As described above, the status engine 235 may identify the current connection or lack of connection to a PLMN. With the first mechanism, the status engine 235 may determine if a current connection with a cell of the HPLMN 120 uses a higher order RAT or a lower order RAT. When a foreground data exchange request in which a user provides an input indicative of the data request or a background request in which an application (e.g., an operating system, an email client, etc.) provides an automatically generated input indicative of the data request) is received, the status engine 235 may initiate the selection procedure by providing an output providing details of the current connection, if there is a current connection.

The quality engine 240 may determine a quality of a current connection by determining a throughput rate provided by the current connection. The throughput rate may be determined based on an amount of data exchanged over a period of time. The quality engine 240 may utilize a predetermined threshold that is to be satisfied if use of the currently connected cell is to be maintained. For example, the predetermined threshold for the throughput rate may be 400 to 500 Kbps. Otherwise, the quality engine 240 may provide an output that the currently connected cell is not performing up to a minimum quality or throughput rate. The predetermined threshold may be set to a conservative value such that a current connection may be utilized without an aggressive re-selection to another cell. The predetermined threshold may also use a sliding time window such that an instantaneous throughput rate is not used as a sole basis for reselection, but an average throughput rate observed in the time window that is contemporary to a current set of conditions of the UE 110 serves as the basis for reselection. For example, the time window in which the throughput rate is observed may be 5 to 10 seconds. The quality engine 240 may be used for each cell that is connected to by the UE 110 in either the HPLMN 120 or the VPLMN 130.

It is noted that there may be a single predetermined threshold used for cells of both the HPLMN 120 and the VPLMN 130 in determining whether use of the cell satisfies the minimum quality. However, the use of a single predetermined threshold is only exemplary. The quality engine 240 may utilize a first predetermined threshold for cells of the HPLMN 120 and a second predetermined threshold for cells of the VPLMN 130. The first predetermined threshold may be greater than the second predetermined threshold or vice versa. However, for illustrative purposes, the exemplary embodiments are described herein using a single predetermined threshold.

It is also noted that the throughput rate is only an exemplary standard upon which the quality engine 240 may determine a relative quality of cell to which the UE 110 has established a connection. The exemplary embodiments may utilize any basis upon which to determine the relative quality. For example, various network metrics (e.g., BLER, RSSI, RSRP, RSRQ, power headroom, etc.) may also be used as the basis. Again, to avoid using an instantaneous value that may be biased in one way, the network metric may be determined as an average value over the time window. However, the time window is also only exemplary and the exemplary embodiments may also be configured to use instantaneous values when applicable.

The scanning engine 245 may discover cells of the HPLMN 120 and/or the VPLMN 130. With the first mechanism, the scanning engine 245 may be used when a new cell is to be selected. Accordingly, the scanning engine 245 may trigger operations of the baseband processor and the transceiver 225 to discover which cells are capable of being connected to by the UE 110. Those skilled in the art will understand that the scanning engine 245 may utilize any mechanism in which to discover cells.

The selection engine 250 may select between the HPLMN 120 and the VPLMN 130 based on the outputs of the engines 235-245. With the first mechanism, the selection engine 250 may select between the HPLMN 120 and the VPLMN 130 through analysis of the throughput rates of the discovered HPLMN and VPLMN cells. Specifically, the selection engine 250 may utilize an iterative process to exhaust available cells in the HPLMN 120 and the VPLMN 130. For example, the selection engine 250 may receive a quality of a current cell. If the current cell does not meet the minimum quality, the selection engine 250 may receive a list of available cells in the HPLMN 120 and the VPLMN 130. The selection engine 250 may select one of these cells and the quality engine 240 may perform its functionality. Accordingly, operations may be used to perform a handover between cells of the corresponding PLMN or between PLMNs. The selection engine 250 may continue this process until a cell is found to provide the minimum quality. It is noted that the HPLMN and VPLMN cells that are analyzed with this process may refer to a higher order RAT cell.

If no cell is found, the selection engine 250 may utilize a fallback connection. For example, if the HPLMN 120 is available, the selection engine 250 may select a lower order RAT cell in the HPLMN to which the UE 110 is to connect. If the HPLMN 120 is unavailable, the selection engine 250 may select a lower order RAT cell in the VPLMN to which the UE 110 is to connect. If no lower order RAT cell is found, the UE 110 may remain disconnected for a duration of time at which point the above process may again be performed.

The selection engine 250 may be configured to utilize a prioritization. With the first mechanism, the selection engine 250 may prioritize the cells of the HPLMN 120 prior to any consideration of the cells of the VPLMN 130. Accordingly, the above described iterative process may consider each discovered cell of the HPLMN 120 to afford each of these HPLMN cells an opportunity to satisfy the minimum quality before roaming services are used. The selection engine 250 may also be configured to select the next cell to analyze in a variety of manners. In a first example, the selection engine 250 may randomly select one of the available cells that are discovered. In a second example, the selection engine 250 may use a time criteria to select the next cell. For example, a cell that identifies itself prior to another cell (e.g., via a discovery signal/response) may be positioned at a higher position on a list of discovered cells. In a third example, the selection engine 250 may receive a network metric associated with each discovered cell. For example, a RSSI of a signal from the discovered cell may be associated and used by the selection engine 250 as a benchmark to position discovered cells on a list of discovered cells. It is noted that when the third example is used, the selection engine 250 may forgo the prioritization of considering cells of the HPLMN 120 prior to cells of the VPLMN 130. In this manner, a cell in either the HPLMN 120 or the VPLMN 130 with a higher likelihood of providing the minimum quality may be analyzed for use prior to a cell with a lower likelihood.

The selection engine 250 may also prioritize the fallback connection. For example, the fallback connection may prioritize the HPLMN 120 over the VPLMN 130. In an exemplary implementation, the lower order RAT cells of the HPLMN 120 may be prioritized over lower order RAT cells of the VPLMN 130.

In an exemplary implementation of the first mechanism according to the exemplary embodiments, the UE 110 may select a cell of the HPLMN 120 or the VPLMN 130 based on an initial determination by the status engine 235 and the quality engine 240 indicating (1) a current connection to a higher order RAT cell providing an insufficient throughput rate or (2) a current connection to a lower order RAT cell. When the status engine 235 indicates the higher order RAT cell, the UE 110 may evaluate all the higher order RAT cells in the HPLMN 120 based on the throughput rate. As those skilled in the art will understand, the lower layers of the baseband processor may be configured with a capability of determining the throughput rate metric. By using the predetermined threshold, the selection engine 250 may evaluate a currently connected cell over a time window and failure to meet the predetermined threshold may be used as a selection criteria to either proceed with a data transfer in the HPLMN cells or move to a higher order RAT VPLMN cell (as discovered by the scanning engine 245) and perform the data transfer.

When the status engine 235 indicates the lower order RAT cell, the UE 110 may immediately evaluate all the higher order RAT cells in the VPLMN 130 based on the throughput rate. As a data transfer indication is received and a connected state is to be used, the use of the lower order RAT cell may indicate that no higher order RAT cells are available in the HPLMN 120. By using the predetermined threshold, the selection engine 250 may evaluate the cells of the VPLMN 130 over a time window and failure to meet the predetermined threshold may be used as a selection criteria to select another cell of the VPLMN 130 prior to remaining on the lower order RAT cell of the HPLMN to perform the data exchange.

With regard to the second mechanism according to the exemplary embodiments, the status engine 235, the scanning engine 245, and the selection engine 250 may perform corresponding operations in scanning for cells of the HPLMN 120 and the VPLMN 130 to establish a connection to a discovered cell. As described above, the status engine 235 may identify the current connection or lack of connection to a PLMN. With the first mechanism, the status engine 235 may determine if service from the HPLMN 120 is available. Thus, the status engine 235 may initiate the selection procedure by providing an output indicating loss of service to the HPLMN 120. For example, a scan request may be issued to the scanning engine 245. Specifically, the scan request may be for the VPLMN 130 and cells thereof. In this manner, the status engine 235 may utilize conventional operations. For illustrative purposes, any reference to the VPLMN 130 with the second mechanism may refer to non-roaming VPLMNs while any reference to the HPLMN 120 with the second mechanism may refer to the HPLMN and roaming VPLMNs.

The scanning engine 245 may discover cells of the HPLMN 120 and/or the VPLMN 130. With the second mechanism, the scanning engine 245 may be used when the UE 110 has lost service from the HPLMN 120. Accordingly, the scanning engine 245 may trigger operations of the baseband processor and the transceiver 225 to discover cells of the HPLMN 120 and the VPLMN 130. Although a scan request may have been issued for a particular set of cells to be discovered, the scanning engine 245 may return results for all discovered cells to the selection engine 250.

The selection engine 250 may be configured to select between the HPLMN 120 and the VPLMN 130 based on the outputs of the engines 235, 245. In a second aspect under the second mechanism according to the exemplary embodiments, the selection engine 250 may select between the HPLMN 120 and the VPLMN 130 based on discovery of cells as results from scans. Based on which of the HPLMN 120 and the VPLMN 130 that is selected, the selection engine 250 may also select a corresponding setting that is to be used. As the second mechanism may relate to when a data roaming capability is disabled, the HPLMN 120 may be prioritized over the VPLMN 130. Therefore, among the discovered cells, the selection engine 250 may prioritize the cells of the HPLMN 120 over the cells of the VPLMN 130.

If the discovered cells include a cell of the HPLMN 120, the selection engine 250 may select this cell. Upon selection of a cell of the HPLMN 120, the selection engine 250 may also indicate that a full service setting is to be used that does not disable any connection capabilities. However, if the discovered cells only include cells of the VPLMN 130 (i.e., no cell of the HPLMN 120 is discovered), the selection engine 250 may select one of the cells of the VPLMN 130. Upon selection of a cell of the VPLMN 130, the selection engine 250 may also indicate that a limited service setting is to be used in which at least one connection capability is disabled. For example, the limited service setting may be an emergency only mode in which only emergency service related operations are allowed while all other operations are disabled. It is noted that when selecting a cell when there is a plurality of cells from which to select in either the HPLMN 120 or the VPLMN 130, the selection engine 250 may utilize a substantially similar selection process as described above (e.g., random selection, time criteria selection, network metric criteria selection, etc.).

Figure 3:
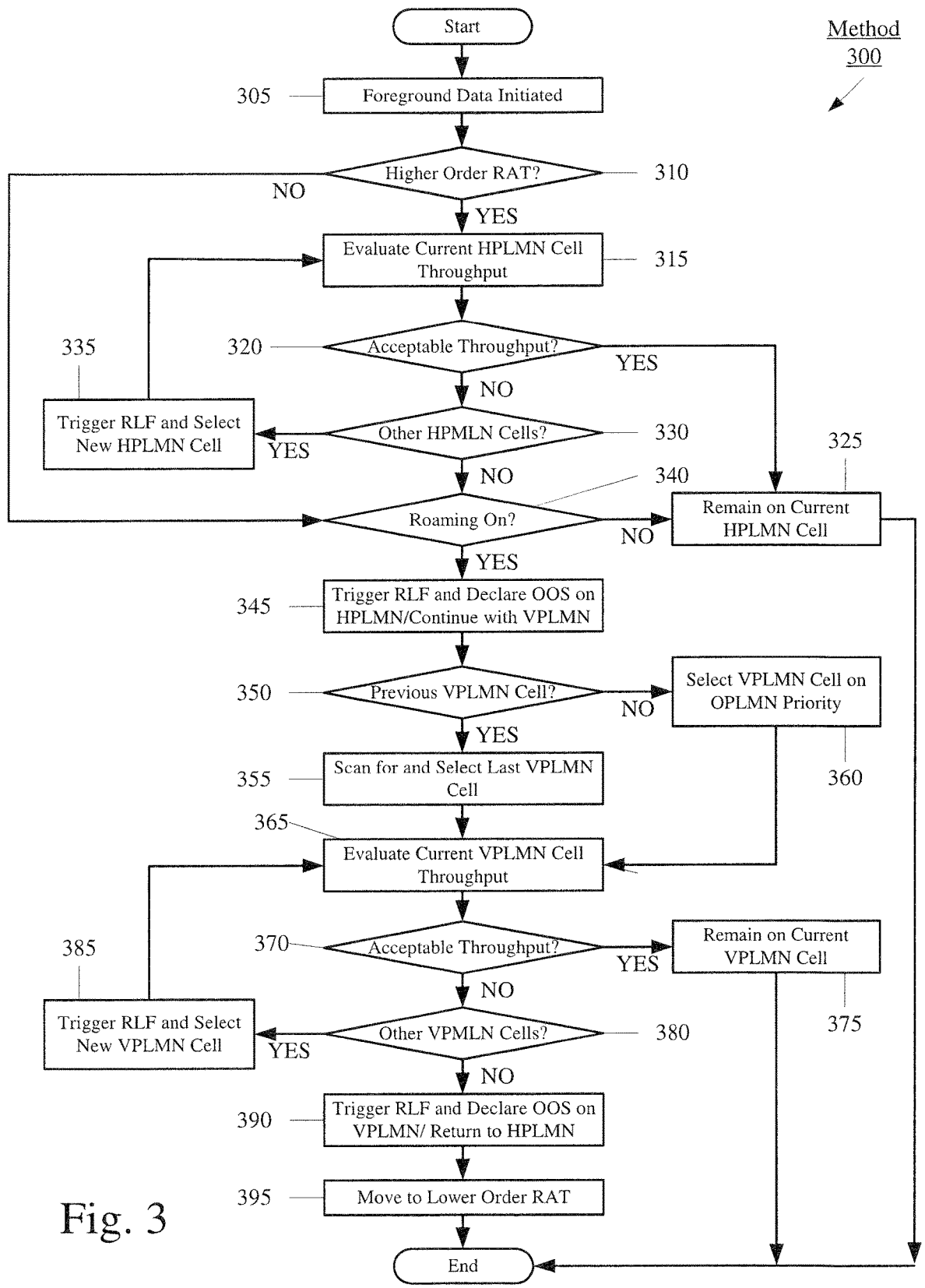
FIG. 3 shows an example method for selecting a network to which to connect based on current conditions according to various exemplary embodiments described herein.

FIG. 3 shows an example method 300 for selecting a network to which to connect based on current conditions according to various exemplary embodiments described herein. Specifically, the UE 110 may determine whether to connect to a cell of the HPLMN 120 or to a cell of the VPLMN 130 as well as utilizing a fallback connection to a lower order RAT cell of the HPLMN 120 if no higher order RAT cell is available on both the HPLMN 120 and the VPLMN 130. The method 300 may be performed by any component or components of a wireless device, such as the status engine 235, the quality engine 240, the scanning engine 245, and the selection engine 250 of the UE 110. The method 300 will be described with regard to the network arrangement 100 of FIG. 1 and the UE 110 of FIG. 2.

In 305, the UE 110 initiates a foreground data exchange. The foreground data exchange may be exemplary and represent any indication in which a connected state is to be used and a subsequent data exchange is to be performed. With the imminent data exchange, the UE 110 may utilize the features of the first mechanism according to the exemplary embodiments to select a cell of the HPLMN 120 or the VPLMN 130 to perform this data exchange.

In 310, the UE 110 determines whether a current connection is on a higher order RAT cell of the HPLMN 120. As noted above, the UE 110 may consider the higher order RAT cells of the HPLMN 120 when available by using an additional set of operations. There may be an underlying assumption that there may also be other higher order RAT cells of the HPLMN 120 that may be available. Accordingly, the UE 110 may continue to 315. However, if the UE 110 is currently connected to a lower order RAT cell of the HPLMN 120, the UE 110 may assume that higher order RAT cells of the HPLMN 120 are unavailable and may immediately continue to evaluate higher order RAT cells of the VPLMN 130. Accordingly, the UE 110 may continue to 340.

For illustrative purposes, it may be considered that the UE 110 is currently connected to the HPLMN 120. However, the exemplary embodiments may also be utilized when the UE 110 is currently connected to the VPLMN 130. For illustrative purposes, the method 300 is also described where cells of the HPLMN 120 are prioritized over cells of the VPLMN 130. Thus, the iterative analysis of the first mechanism may consider the cells of the HPLMN 120 prior to any consideration being given to the cells of the VPLMN 130. However, as described above, the prioritization of HPLMN cells is not a requirement of the exemplary embodiments.

When the UE 110 is currently connected to a higher order RAT cell of the HPLMN 120, in 315, the UE 110 evaluates a throughput rate of the current higher order RAT HPLMN cell. As noted above, the throughput rate may be an exemplary standard and other measurements may be used. Also noted above, the throughput rate may be evaluated over a period of time. Thus, the UE 110 may evaluate the total amount of data over the period of time and determine an average throughput rate in this period of time. In 320, the UE 110 determines whether the throughput rate is acceptable. For example, the UE 110 may compare the throughput rate to a predetermined threshold. If the throughput rate is at least the predetermined threshold, the UE 110 continues to 325 where the current higher order RAT HPLMN cell to which the UE 110 is connected is selected to be used for the data exchange. However, if the throughput rate is under the predetermined threshold, the UE 110 continues to 330 to determine if other higher order RAT HPLMN cells are available. For example, a scan request to determine available higher order RAT HPLMN cells may be performed. In an exemplary implementation, the UE 110 may scan for Evolved Universal Terrestrial Radio Access (E-UTRA) Absolute Radio Frequency Channel Numbers (EARFCNs). The other higher order RAT HPLMN cells may be accumulated into an acquisition database. If no higher order RAT HPLMN cell is discovered, the UE 110 continues to 340. However, if at least one further higher order RAT HPLMN cell is discovered, the UE 110 continues to 335 where a radio link failure (RLF) is triggered (e.g., to disconnect from the current higher order RAT HPLMN cell) and a handover procedure is performed. Specifically, a new higher order RAT HPLMN cell is selected to establish a connection. As noted above, the new higher order RAT HPLMN cell may be selected based on various standards (e.g., random, time, network metric, etc.). The method may then return to 315 where the throughput rate is evaluated for the new higher order RAT HPLMN cell. In this manner, cells of the HPLMN 120 may be evaluated until a satisfactory higher order RAT HPLMN cell is found and used (in 325) or the UE 110 continues to 340.

When no higher order RAT HPLMN cells are available (e.g., through evaluation or by assumption), in 340, the UE 110 determines if a data roaming capability is enabled (e.g., a data roaming switch is ON). The data roaming capability may be a setting that is manually set or automatically set by default. For example, the data roaming capability may always be an option that is deactivated and only capable of being activated by a user manually changing the default setting. If the data roaming capability is deactivated, the UE 110 continues to 325 where the current HPLMN cell (whether higher order RAT or lower order RAT) is maintained for use in the data exchange. That is, since the user does not want to use data roaming, there is no further analysis of the VPLMN. It is noted that the UE 110 may also perform further operations to select the higher order RAT HPLMN cell having the highest throughput based on the previous evaluations. For example, the UE 110 is not required to remain on the currently connected HPLMN cell but may select a different HPLMN cell if available.

If the data roaming capability is activated and the throughput of the HPLMN cells is not acceptable or the UE 110 is currently connected to a lower order HPLMN cell, in 345, the UE 110, in response to these conditions, triggers a RLF to disconnect from the current HPLMN cell and also declares an out-of-service (OOS) condition to the HPLMN 120. By declaring the OOS, the UE 110 may disconnect from the HPLMN 120 altogether and attempt to roam and connect to the VPLMN 130. Thus, in 350, the UE 110 initially determines whether the UE 110 had previously camped on a cell of the VPLMN 130. This determination may provide an initial operation to roam to the VPLMN. Prioritizing a previously connected cell in the VPLMN 130 may include various implications such as a capability to connect to the cell, an assumption that the cell of the VPLMN 130 previously provided an acceptable throughput rate, etc. If the UE 110 has previously connected to a cell of the VPLMN 130, the UE 110 continues to 355 where the last camped cell of the VPLMN is selected. If the UE 110 has not previously connected to the VPLMN 130, the UE 110 continues to 360 where an operator PLMN (OPLMN) list is fetched (e.g., by a non-access stratum (NAS)) and a scan is performed to identify the cells of the VPLMN 130. Subsequently, the VPLMN cell that was selected in either 355 or 360 is evaluated for a throughput rate in 365.

It is noted that the identification of the previously camped cell of the VPLMN 130 may include further operations. For example, there may be a confirmation that the UE 110 is in a substantially similar location as when the UE 110 was previously camped on this cell of the VPLMN 130. In another example, there may be a confirmation that the VPLMN 130 is at least available to the UE 110 to scan for the previously camped cell. As noted above, the VPLMN 130 may represent many provider networks and the previously connected VPLMN cell may be from a provider network that is not currently available. Accordingly, there may be additional determinations that are made prior to the UE 110 utilizing 355 for a previous cell of the VPLMN 130 that the UE 110 has connected.

In 370, the UE 110 determines if the currently connected higher order RAT VPLMN cell has an acceptable throughput rate. In a substantially similar manner as 320, the UE 110 may utilize the same predetermined threshold or a respective predetermined threshold only for cells of the VPLMN 130. The UE 110 may then utilize substantially similar operations in 375-385 as 325-335. Specifically, if the throughput rate is acceptable, in 375, the UE 110 remains on the higher order RAT VPLMN cell. If the current higher order RAT VPLMN cell does not provide an acceptable throughput, in 380, the UE 110 determines if other higher order RAT VPLMN cells are available to evaluate. If other higher order RAT VPLMN cells are available, in 385, the UE 110 triggers a RLF, selects a new higher order RAT VPLMN cell, and evaluates the throughput rate.

If no higher order RAT HPLMN cell and no higher order RAT VPLMN cell provides an acceptable throughput rate, in 390, the UE 110 triggers a RLF and declares an OOS (if connected to the VPLMN) such that the UE 110 may return to the HPLMN. In 395, the UE 110 selects a cell of the HPLMN 120 to move to a lower order RAT HPLMN cell. As noted above, these operations may refer to a fallback connection when no acceptable throughput rate higher order network cell is available. However, there may be a further determination for whether service from the HPLMN 120 is even available at this point. If the HPLMN 120 is unavailable, the UE 110 may also utilize a lower order RAT VPLMN cell.

Figure 4:
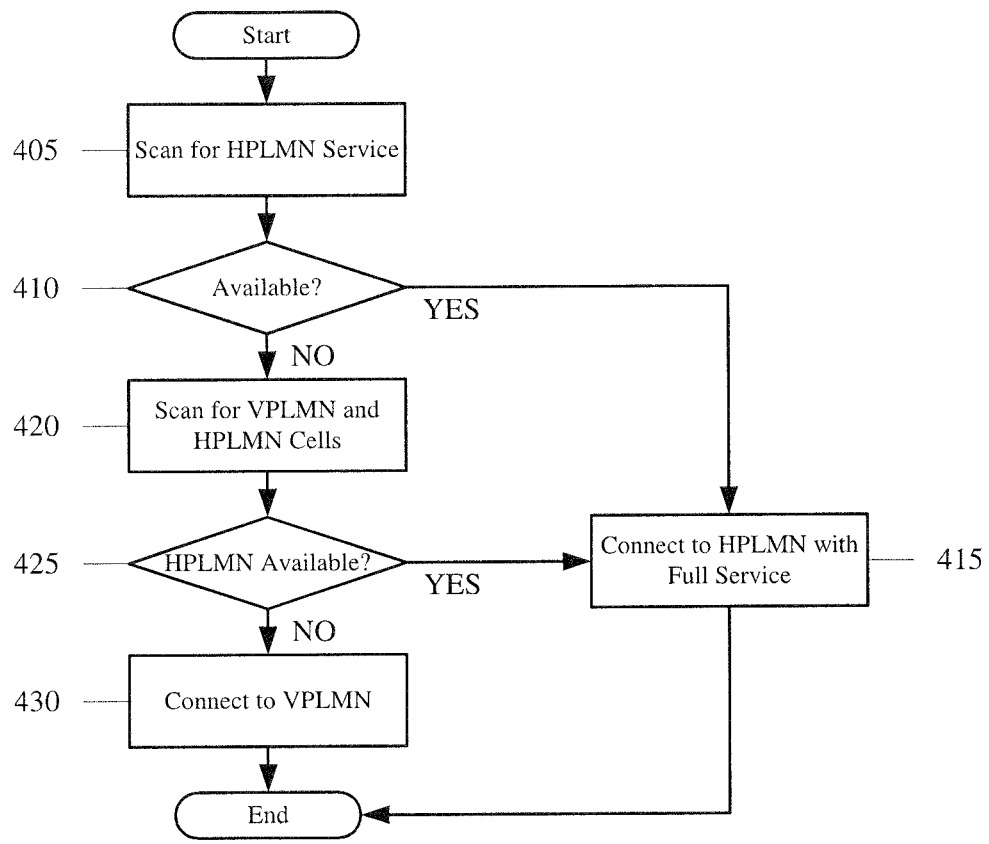
FIG. 4 shows an example method for scanning for networks to which to connect according to various exemplary embodiments described herein.

FIG. 4 shows an example method 400 for scanning for networks to which to connect according to various exemplary embodiments described herein. Specifically, the UE 110 may perform a scan that considers available cells in the HPLMN 120 and the VPLMN 130 (both roaming and non-roaming) and utilizes a corresponding setting based on the availability and subsequent connection. The method 300 may be performed by any component or components of a wireless device, such as the status engine 235, the scanning engine 245, and the selection engine 250 of the UE 110. The method 300 will be described with regard to the network arrangement 100 of FIG. 1 and the UE 110 of FIG. 2.

In 405, the UE 110 scans for service on the HPLMN 120 and roaming VPLMNs of the VPLMN 130. As noted above, there may be a variety of reasons for a scan request for cells of the HPLMN 120 or roaming VPLMNs 130 to be issued (e.g., requiring a connected state for an imminent data exchange, timer based, etc.). In 410, the UE 110 determines if the service from the HPLMN 120 or the roaming VPLMNs 130 is available. If the service from the HPLMN 120 or the roaming VPLMNs 130 is available, the UE 110 continues to 415. In 415, the UE 110 connects to a cell of the HPLMN 120 or the roaming VPLMNs 130. The UE 110 also connects to the HPLMN 120 or the roaming VPLMNs 130 with full service such that network capabilities are not prevented.

However, if the service from the HPLMN 120 or the roaming VPLMNs is unavailable, the UE 110 continues to 420. In 420, the UE 110 scans for cells of the HPLMN 120 and the VPLMN 130 (both roaming and non-roaming). Despite the UE 110 having determined that service from the HPLMN 120 or the roaming VPLMNs 130 is unavailable in 410, a sufficient amount of time may have passed for the UE 110 to again be capable of being provided service from the HPLMN 120 or the roaming VPLMNs 130. Thus, there may be a possibility that cells of the HPLMN 120 or the roaming VPLMNs 130 are discovered. In 425, the UE 110 determines if a cell of the HPLMN 120 or the roaming VPLMNs 130 has been discovered or that service from the HPLMN 120 or the roaming VPLMNs 130 is available. If HPLMN or roaming VPLMN service is available, the UE 110 continues to 415. However, if HPLMN or roaming VPLMN service is still unavailable, the UE 110 continues to 430. In 430, the UE 110 connects to a non-roaming VPLMN 130. The UE 110 may also connect to the VPLMN 130, for example, with limited service such that select or most network capabilities are disabled (e.g., an emergency mode).

It is noted that the UE 110 may be configured to select between the method 300 of the first mechanism and the method 400 of the second mechanism. For example, enabling or disabling a data roaming capability may indicate which of the mechanisms to be used. Thus, if the data roaming capability has been enabled, there may be an indication that the UE 110 is to use the method 300. Accordingly, when the UE 110 scans for HPLMN service in 405 of the method 400, and if HPLMN service is still unavailable in 425, the UE 110 may continue to the method 300 to utilize the method 300 when a connected state is to be used. In another example, when features of the second mechanism is incorporated into the first mechanism, whenever the UE 110 scans for cells of the VPLMN 130 (e.g., when a scan request is issued for VPLMN cells) and a new, before undiscovered cell of the HPLMN 120 is found, the UE 110 may evaluate this cell of the HPLMN 120 prior to continuing with evaluating the cells of the VPLMN 130. That is, the UE 110 may continue from 350 to 335 (this pathway not shown). In this manner, the UE 110 may be configured to utilize the first mechanism and the second mechanism concurrently to select a cell of the HPLMN 120 or the VPLMN 130 for a connected state as well as for scanning purposes to identify cells.

The exemplary embodiments provide a device, system, and method of selecting a connection to a cell of a HPLMN or a VPLMN. When a data exchange is to be performed and with a data roaming capability enabled, a UE may opportunistically select to use a cell that provides at least a minimum quality such that a user experience is not unduly impacted from forcing use of a low quality connection. With situations where service from the HPLMN may be determined to be unavailable, an efficient scanning operation may opportunistically still consider discovered cells of the HPLMN despite a scan request being issued for cells of the VPLMN.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   at a user equipment (UE) connected to a first home cell of a home public land mobile network (HPLMN):
   determining that the first home cell of the HPLMN corresponds to a type of radio access technology (RAT);
   when the type of the first home cell of the HPLMN corresponds to a first type of RAT, determining a first quality of a connection to the first home cell;
   in response to the first quality not satisfying a first predetermined threshold, disconnecting from the HPLMN;
   when the first home cell of the HPLMN corresponds to a second type of RAT, initiating a procedure that causes the UE to disconnect from the HPLMN;
   in response to disconnecting from the HPLMN, connecting to a first visited cell of a visited public land mobile network (VPLMN);
   determining a second quality of a connection to the first visited cell of the VPLMN; and
   when the second quality of the connection to the first visited cell of the VPLMN is above a second predetermined threshold, performing a data exchange via the first visited cell.

2. The method of claim 1, wherein the first quality and second quality comprise throughput rates.

3. The method of claim 2, wherein the throughput rates are determined over a respective period of time.

4. The method of claim 1, wherein the first type of RAT comprises one of a Long Term Evolution (LTE) cell or a 5G cell and the second type of RAT comprises one of a 2G cell or a 3G cell.

5. The method of claim 1, wherein the disconnecting from the HPLMN comprises triggering a radio link failure (RLF) and declaring an out-of-service (OOS) to the HPLMN.

6. The method of claim 1, further comprising:
when the second quality is below the second predetermined threshold, scanning for a second visited cell; and
when the second visited cell is found via the scan, connecting to the second visited cell;
determining a third quality of a connection to the second visited cell; and
when the third quality of the connection to the second visited cell is above the second predetermined threshold, performing the data exchange via the second visited cell.

7. The method of claim 1, further comprising:
when the second quality is below the second predetermined threshold, scanning for a second visited cell; and
when the second visited cell is not found, connecting to a second home cell of the HPLMN, wherein the second home cell corresponds to the second type of RAT.

8. The method of claim 1, further comprising:
when the first quality is below the first predetermined threshold and prior to disconnecting from the HPLMN, scanning for a second home cell of the HPLMN, wherein the second home cell corresponds to the first type of RAT;
disconnecting from the first home cell;
connecting to the second home cell;
determining a third quality of a connection to the second home cell; and
when the third quality is above the first predetermined threshold, performing the data exchange via the second home cell.

9. The method of claim 1, further comprising:
determining whether a data roaming capability setting is enabled.

10. The method of claim 9, wherein the data exchange via the first visited cell is prevented when the data roaming capability setting is disabled.

11. The method of claim 1, wherein the first visited cell comprises one of a last camped cell of the VLPMN for the UE or a cell on an operator PLMN (OPLMN) list obtained by the UE.

12. A user equipment (UE), comprising:
a transceiver configured to connect to a first home cell of a home public land mobile network (HPLMN);
a processor configured to determine that the first home cell of the HPLMN corresponds to a type of radio access technology (RAT), when the first home cell of the HPLMN corresponds to a first type of RAT, determine a first quality of a connection to the first home cell, the processor, in response to the first quality not satisfying a first predetermined threshold, instructs the transceiver to disconnect from the HPLMN and connect to a first visited cell of a visited public land mobile network (VPLMN), the processor, in response to determining the first home cell of the HPLMN corresponds to a second type of RAT, initiating a procedure that causes the UE to disconnect from the HPLMN and connect to the first visited cell of the VPLMN, when connected to the first visited cell of the VPLMN, determine a second quality of a connection to the first visited cell and when the second quality of the connection to the first visited cell of the VPLMN is above a second predetermined threshold, performing a data exchange via the first visited cell.

13. The UE of claim 12, wherein the first quality and second quality comprise throughput rates, wherein the throughput rates are determined over a respective period of time.

14. The UE of claim 12, wherein the processor is further configured to, when the second quality is below the second predetermined threshold, instruct the transceiver to scan for a second visited cell and when the second visited cell is found via the scan, instruct the transceiver to connect to the second visited cell, determine a third quality of a connection to the second visited cell and when the third quality of the connection to the second visited cell is above the second predetermined threshold, performing the data exchange via the second visited cell.

15. The UE of claim 12, wherein the processor is further configured to, when the second quality is below the second predetermined threshold, instruct the transceiver to scan for a second visited cell and when the second visited cell is not found, instruct the transceiver to connect to a second home cell of the HPLMN, wherein the second home cell corresponds to the second type of RAT.

16. A user equipment (UE), comprising:
circuitry configured to connect to a first home cell of a home public land mobile network (HPLMN);
circuitry configured to determine that the first home cell of the HPLMN corresponds to a second type of radio access technology (RAT);
when the first home cell of the HPLMN corresponds to a first type of RAT, circuitry configured to determine a first quality of a connection to the first home cell;
in response to the first quality not satisfying a first predetermined threshold, circuitry configured to disconnect from the HPLMN;
when the first home cell of the HPLMN corresponds to a second type of RAT, circuitry configured to initiate a procedure that causes the UE to disconnect from the HPLMN;
in response to disconnecting from the HPLMN, circuitry configured to connect to a first visited cell of a visited public land mobile network (VPLMN);
circuitry configured to determine a second quality of a connection to the first visited cell; and
when the second quality of the connection to the first visited cell is above a second predetermined threshold, circuitry configured to perform a data exchange via the first visited cell.

17. A method, comprising:
at a user equipment (UE) connected to a cell of a home public land mobile network (HPLMN):
determining a service disruption in the HPLMN, wherein the service disruption indicates that no cells of the HPLMN are currently available for connection;
issuing a scan request, wherein a scan request result includes cells of a non-roaming visited public land mobile network (VPLMN), the non-roaming VPLMN lacking a roaming agreement with the HPLMN;
when the scan request result includes at least one cell of the HPLMN or a roaming VPLMN, the roaming VPLMN having the roaming agreement with the HPLMN, connecting to the HPLMN or the roaming VPLMN via the at least one cell, wherein a connection to the at least one cell of the HPLMN or the roaming VPLMN comprises a full service connection, wherein the connecting is in response to the scan request without a further scan request; and when the scan request includes only cells of the non-roaming VPLMN, connecting to one of the cells of the non-roaming VPLMN, wherein a connection to the one of the cells of the non-roaming VPLMN comprises a limited service connection.

18. The method of claim 17, wherein the limited service connection is an emergency mode.

19. The method of claim 17, wherein, when the scan request result includes at least one cell of the HPLMN or a roaming VPLMN, a priority is given to at least one cell of the HPLMN.

* * * * *